(12) United States Patent
Hushchyn et al.

(10) Patent No.: US 10,204,438 B2
(45) Date of Patent: Feb. 12, 2019

(54) DYNAMIC REAL-TIME GENERATION OF THREE-DIMENSIONAL AVATAR MODELS OF USERS BASED ON LIVE VISUAL INPUT OF USERS' APPEARANCE AND COMPUTER SYSTEMS AND COMPUTER-IMPLEMENTED METHODS DIRECTED TO THEREOF

(71) Applicants: Yury Hushchyn, Vilnius (LT); Dzmitry Kachatkou, Minsk (BY)

(72) Inventors: Yury Hushchyn, Vilnius (LT); Dzmitry Kachatkou, Minsk (BY)

(73) Assignee: Banuba Limited, Wan Chai (HK)

( * ) Notice: Subject to any disclaimer, the term of this patent is extended or adjusted under 35 U.S.C. 154(b) by 0 days.

(21) Appl. No.: 15/956,450

(22) Filed: Apr. 18, 2018

(65) Prior Publication Data
US 2018/0300927 A1    Oct. 18, 2018

Related U.S. Application Data

(63) Continuation of application No. 62/486,763, filed on Apr. 18, 2017.

(51) Int. Cl.
*G06K 9/00* (2006.01)
*G06T 13/40* (2011.01)
(Continued)

(52) U.S. Cl.
CPC .......... *G06T 13/40* (2013.01); *G06K 9/00248* (2013.01); *G06K 9/00261* (2013.01); *G06T 17/30* (2013.01); *H04L 65/602* (2013.01)

(58) Field of Classification Search
None
See application file for complete search history.

(56) References Cited

U.S. PATENT DOCUMENTS

| 9,314,692 B2 | 4/2016 | Konoplev et al. |
| 2009/0290791 A1* | 11/2009 | Holub ................ G06K 9/00234 382/164 |

(Continued)

OTHER PUBLICATIONS

Cao, C., Weng, Y., Lin, S. and Zhou, K., 2013. 3D shape regression for real-time facial animation. ACM Transactions on Graphics (TOG), 32(4), p. 41.*

(Continued)

*Primary Examiner* — Xin Sheng
(74) *Attorney, Agent, or Firm* — Greenberg Traurig, LLP (57) ABSTRACT

In some embodiments, the present invention provides for a computer system that may include a camera component configured to acquire a visual content, where the visual content includes a plurality of frames having a visual representation of a person's face; and a processor configured to: train a face detection regressor with a synthetic face model database to obtain a face detection trained regressor; apply, for each frame, the face detection trained regressor to detect or to track the face based on facial features, local features, and a pre-defined hyperparameter; construct an intermediate multi-dimensional face model; apply machine learning to determine features of an intermediate multi-dimensional head model; construct a multi-dimensional avatar; and utilize the multi-dimensional avatar to perform an activity associated with the person.

20 Claims, 4 Drawing Sheets

(51) Int. Cl.
*G06T 17/30* (2006.01)
*H04L 29/06* (2006.01)

(56) References Cited

U.S. PATENT DOCUMENTS

| 2014/0185924 | A1  | 7/2014 | Cao et al. |
| 2015/0125049 | A1* | 5/2015 | Taigman ............ G06K 9/00268 |
| | | | 382/118 |
| 2015/0169938 | A1  | 6/2015 | Yao et al. |
| 2016/0006987 | A1  | 1/2016 | Li et al. |

OTHER PUBLICATIONS

Belhumeur et al., "Localizing Parts of Faces Using a Consensus of Exemplars", CVPR '11 Proceedings of the 2011 IEEE Conference on Computer Vision and Pattern Recognition, pp. 545-552, 2011.
Dollar et al., "Cascaded Pose Regression", California Institute of Technology, pp. 1078-1085, 2010.
Le et al., "Interactive Facial Feature Localization", ECCV'12 Proceedings of the 12th European conference on Computer Vision—vol. Part III, pp. 679-692, 2012.
Liao et al., "Unconstrained Face Detection", pp. 1-14.
Ren et al., "Face Alignment at 3000 FPS via Regressing Local Binary Features", Computer Vision and Pattern Recognition (CVPR), 2014 IEEE Conference, pp. 1-8, 2014.
Sagonas et al., "A semi-automatic methodology for facial landmark annotation", 2013 IEEE Conference on Computer Vision and Pattern Recognition Workshops, pp. 896-903, 2013.
Viola et al., "Rapid Object Detections using a Boosted Cascade of Simple Features", Accepted Conference on Computer Vision and Pattern Recognition 2001.
Xiong et al., "Supervised Descent Method and its Applications to Face Alignment", Computer Vision and Pattern Recognition (CVPR), 2013 IEEE Conference, pp. 532-539, 2013.
International Search Report and Written Opinion from International Application No. PCT/IB2018/000512 dated Sep. 18, 2018.

* cited by examiner

FIG. 1

200
EXAMPLES OF AVATARS

DYNAMIC REAL-TIME GENERATION OF THREE-DIMENSIONAL AVATAR MODELS OF USERS BASED ON LIVE VISUAL INPUT OF USERS' APPEARANCE AND COMPUTER SYSTEMS AND COMPUTER-IMPLEMENTED METHODS DIRECTED TO THEREOF

CROSS-REFERENCE TO RELATED APPLICATIONS

This application claims benefit of U.S. provisional patent application Ser. No. 62/486,763 filed Apr. 18, 2017, which is herein incorporated by reference for all purposes.

FIELD OF THE INVENTION

Generally the present disclosure is directed towards computer systems and computer-implemented methods for dynamic real-time generation of three-dimensional avatar models of users based on live visual input of users' appearance.

BACKGROUND

In computing, an avatar is typically a graphical representation of the user or the user's alter ego or character. An icon or figure representing a particular person in a video game, Internet forum, virtual reality environment, augmented reality environment, etc. It may take either a three-dimensional form or a two-dimensional form.

SUMMARY OF THE INVENTION

In some embodiments, the present invention provides for an exemplary computer-implemented method that may include at least the following steps of: training, by at least one processor, at least one face detection regressor with at least one synthetic face model database to obtain at least one face detection trained regressor; where the at least one synthetic face model database includes a plurality of facial features; where each facial feature is identified by a pre-defined set of parameters; obtaining, by the at least one processor, a plurality of frames having a visual representation of a face of at least one person; extracting, by the at least one processor, a plurality of local features from each frame of the plurality of frames; applying, by the at least one processor, for each frame, the at least one face detection trained regressor to the plurality of local features to detect or to track a presence of a face of a particular individual, based, at least in part, on: i) the plurality of facial features, ii) the plurality of local features, and iii) at least one pre-defined hyperparameter; constructing, by the at least one processor, an intermediate multi-dimensional face model of the face of the particular individual based on the detected or tracked presence of the face of the particular individual; applying, by the at least one processor, machine learning to determine a plurality of features of an intermediate multi-dimensional head model of the particular individual based on the detected or tracked presence of the face of the particular individual; constructing, by the at least one processor, at least one multi-dimensional avatar of the particular individual based, at least in part, on: i) the intermediate multi-dimensional face model of the particular individual, and ii) the plurality of features of the intermediate multi-dimensional head model of the particular individual; and utilizing, by the at least one processor, the at least one multi-dimensional avatar of the particular individual to perform at least one activity associated with the particular individual.

In some embodiments, the plurality of frames is part of a video stream. In some embodiments, the video stream is a real-time video stream. In some embodiments, the real-time video stream is a live video stream.

In some embodiments, the at least one face detection regressor is a combined cascaded regressor that is based on a combination of machine learning algorithms.

In some embodiments, the pre-defined set of parameters is selected from the group consisting of: three-dimensional angles, translates, light vector coordinates, hair styles, beards, anthropometric parameters, facial expressions, and any combination thereof.

In some embodiments, the presence of the face of the particular individual has been detected or has been tracked by applying at least one of: averaging at least two hyperparameters; averaging at least two hyperparameters in a principal component analysis (PCA) space; averaging three-dimensional facial points of at least one facial landmark; averaging two-dimensional facial landmarks; and any combination thereof.

In some embodiments, the plurality of facial features is a plurality of facial landmarks.

In some embodiments, at least one frame of the plurality of frames is obtained by a camera of a portable electronic device and where the at least one processor is at least one first processor of the portable electronic device.

In some embodiments, the training of the at least one face detection regressor is performed by at least one second processor; and where the at least one second processor is distinct from the at least one first processor of the portable electronic device and is remotely located from the portable electronic device.

In some embodiments, the present invention provides for an exemplary computer system that may include at least the following component: a camera component, where the camera component is configured to acquire a visual content, where the visual content includes a plurality of frames having a visual representation of a face of at least one person; and at least one processor configured to: train at least one face detection regressor with at least one synthetic face model database to obtain at least one face detection trained regressor; where the at least one synthetic face model database includes a plurality of facial features; where each facial feature is identified by a pre-defined set of parameters; extract a plurality of local features from each frame of the plurality of frames; apply, for each frame, the at least one face detection trained regressor to the plurality of local features to detect or to track a presence of a face of a particular individual, based, at least in part, on: i) the plurality of facial features, ii) the plurality of local features, and iii) at least one pre-defined hyperparameter; construct an intermediate multi-dimensional face model of the face of the particular individual based on the detected or tracked presence of the face of the particular individual; apply machine learning to determine a plurality of features of an intermediate multi-dimensional head model of the particular individual based on the detected or tracked presence of the face of the particular individual; construct at least one multi-dimensional avatar of the particular individual based, at least in part, on: i) the intermediate multi-dimensional face model of the particular individual, and ii) the plurality of features of the intermediate multi-dimensional head model of the particular individual; and utilize the at least one multi-dimensional avatar of the particular individual to perform at least one activity associated with the particular individual.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DESCRIPTION OF EXEMPLARY EMBODIMENTS

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to effect such feature, structure, or characteristic in connection with other implementations whether or not explicitly described herein.

The term "based on" is not exclusive and allows for being based on additional factors that are not necessarily described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," etc.), and real-time visual imagery acquired through a camera application on a mobile device.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

As used herein, the term "user" shall have a meaning of at least one user.

In some embodiments, the present invention provides an exemplary computer system that includes at least an exemplary specialized inventive computer engine that is configured/programmed to generate three-dimensional (3D) models of users (e.g., users' heads). In some embodiments, the exemplary specialized inventive computer engine may include a face-recognition module that causes to obtain one or more images from, for example but not limited to, a real-time video stream taken by a camera (e.g., stand-alone camera, a camera of a mobile device (e.g., smartphone), a computer-connected camera, etc.). In some embodiments, the face-recognition module of the exemplary specialized inventive computer engine may be further configured to dynamically determine a shape of a face of a user and dynamically create a morphable three-dimensional (3D) facial shape model, and then, utilize the user's face model to generate a 3D model of a user's head (referenced herein as the user's "avatar" or "avatar model").

As used herein, the term "face model" means a model of a human's face (e.g., the user of the camera that would take respective imagery) that is constructed algorithmically based on at least one human's image acquired either in the real-time or not in the real-time. In some embodiments, the face model may be at least one of:

i) a two-dimensional model of a face including a number of points in two-dimensional screen coordinates,
ii) a three-dimensional (3D) model of a face including a number of points in a three dimensional screen, model, or world coordinates,
iii) a two- or a three-dimensional model defined by a set of latent variables (e.g., attitude quaternions, position, scale, mimics, anthropometrics PCA coefficients, or similar),
iv) any combination of thereof.

In some embodiments, the exemplary specialized inventive computer engine may be further configured to utilize one of machine learning models/techniques (e.g., decision trees, boosting, support-vector machines, neural networks, nearest neighbor algorithms, Naive Bayes, bagging, random forests, etc.), face alignment models/techniques, and the 3D morphable facial models/techniques, such as, but not limited to, respective types of models and/or techniques provided in U.S. patent application Ser. No. 15/881,353 which is incorporated herein by reference for at least this specific purpose.

In some embodiments, during the face detection task (e.g., item 105 of FIG. 1), the exemplary illustrative methods and the exemplary illustrative systems of the present invention are specifically configured to improve the face model in a cascaded manner where an exemplary regression model would consequentially update the previous face model into a new one with varied parameters of regressors at each cascade. In some embodiments, the exemplary illustrative methods and the exemplary illustrative systems of the present invention are specifically configured to utilize regression models, or regressors, that apply a combination of at least two or more machine learning algorithms (e.g., a combination of random forest and linear regression) that use, for example but no limiting to, local binary features to predict increments in latent variables (or any other suitable variables, like 2D or 3D landmark points).

In some embodiments, an optimal choice of a set of regressor parameters at each cascade may be achieved by using distributed asynchronous hyperparameter processing and including a penalty constraint to the loss function while training the model by predicting a shape increment and applying the predicated shape increment to update the current estimated shape of the face in the next sequential frame as, for example, provided in U.S. patent application Ser. No. 15/881,353 which is incorporated herein by reference for at least this specific purpose. For example, if N is a number of trees in random forest algorithm, D is a tree depth, L is a number of facial landmarks, and C is a number of cascades, an exemplary configuration may be: D=[3,3,3,3,3,3,3], D=[2,4,7,6,7,7,12], L=68, where array sizes are equal to the exemplary number of cascades.

In some embodiments, the exemplary specialized inventive computer engine may be configured to utilize, but not limited to, a plurality of visual objects (e.g., photographs, video frames, portions of visually streaming data, etc.) representing consecutive visual appearances of the user over a period of time to improve the quality of the user's face model, the user's avatar, or both. In some embodiments, the plurality of visual objects may be 2, 3, 4, 5, 6, 7, 8, 9, 10, etc. In some embodiments, the plurality of visual objects may be between 2 and 100. In some embodiments, the plurality of visual objects may be between 2 and 10. In some embodiments, the plurality of visual objects may be between 2 and 50. In some embodiments, the plurality of visual objects may be between 10 and 50. In some embodiments, the plurality of visual objects may be between 5 and 50. In some embodiments, the plurality of visual objects may be between 5 and 100. In some embodiments, the plurality of visual objects may be between 2 and 1,000. In some embodiments, the plurality of visual objects may be between 2 and 10,000.

In some embodiments, the exemplary specialized inventive computer engine may be further configured/programmed to utilize the generated inventive 3D facial models and/or 3D avatar models for various applications, such as, but not limited to, computer vision, tracking, face analysis, recognition and pose estimation, mobile-device and computer games, mobile-device and computer messaging applications, audio or/and video chats, audio or/and video chats conference calls, mobile-device and computer applications of any other similarly suitable purpose.

In some embodiments, the exemplary specialized inventive computer engine may be further configured/programmed to separate facial expressions and/or anthropometry from the user's facial model. In some embodiments, the exemplary specialized inventive computer engine may be configured to utilize algorithm(s) based on cascaded regression framework to generate the user's face model. In some embodiments, the generated inventive avatar models may be used in electronic games, augmented reality applications, virtual reality applications, and other similarly suitable applications.

Figure 2:
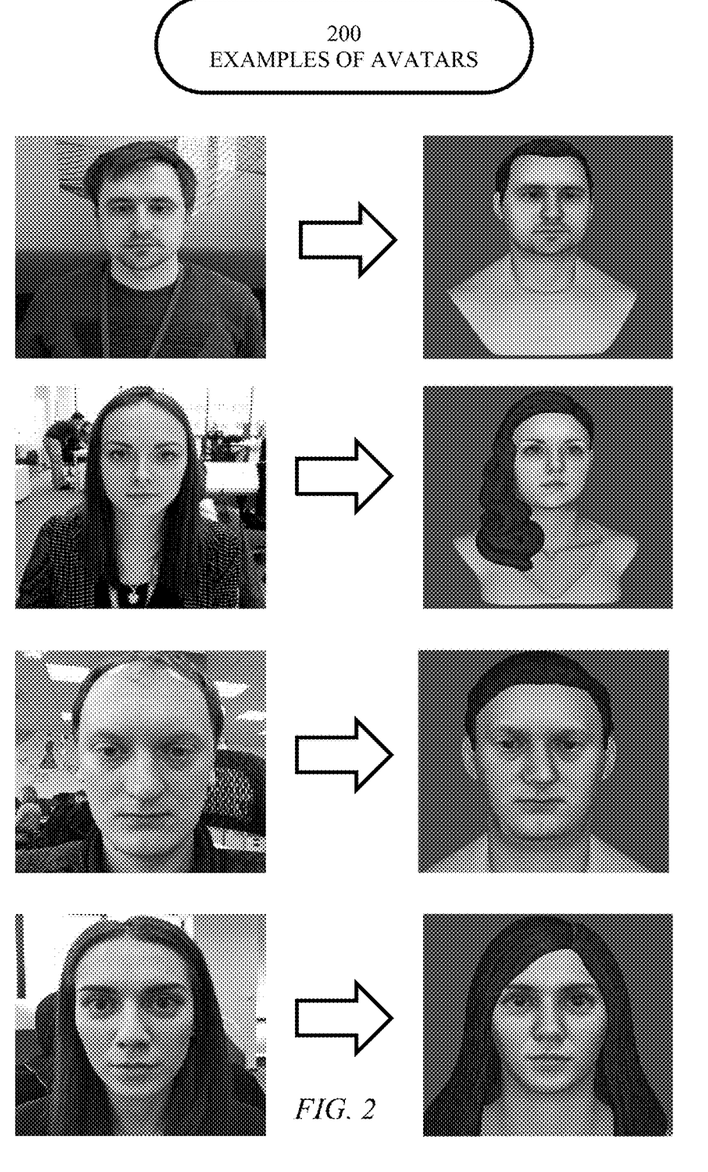
Figure 4:
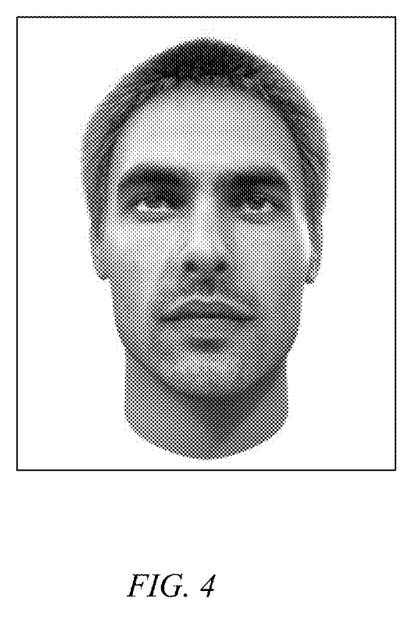

In some embodiments, the exemplary specialized inventive computer engine may be further configured/programmed to utilize at least one morphable face recognition model algorithm to, in real-time or not in real-time, train a regressor, fit a set of three-dimensional parameters, including, but not limited to, camera angles, morphs, anthropometric locations and/or lighting parameters, and generate an intermediate 3D model (e.g., an intermediate face model, an intermediate head model). In some embodiments, the exemplary specialized inventive computer engine may be further configured/programmed to exclude morphs from a respective intermediate model, leaving only one or more anthropometry parameters, and generate the inventive avatar model based on one or more anthropometry parameters (e.g., for example, as shown in FIGS. 2 and 4). In some embodiments, the exemplary regressor may include a combination of machine learning algorithms (e.g., a combination of the random forest and the linear regression). For example, the random forest may be in the form of a vector of features based on the pixel differences (e.g. (pixel2−pixel1)/(pixel2+pixel1+1), or (pixel2−pixel1)/(pixel1+1), etc.). For example, the linear regression may be applied to the output from the random forest technique. For example, the linear regression output may be in the form of predicted variables that would be meta-parameters for the exemplary inventive face recognition model such as, but not limited to, latent variables that include head pose, anthropometric, mimic coefficients, and similar others.

In some embodiments, the exemplary inventive system of the present invention is configured/programmed to obtain, for example, a sequence of images/frames from a video stream taken from a frontal camera of a mobile device. In some embodiments, the exemplary specialized inventive computer engine may be further configured/programmed to process the sequence of images/frames as detailed herein and utilize the processed images/frames as an input for the regressor. Then, in some embodiments, the exemplary specialized inventive computer engine may be further configured/programmed to modify/add to the intermediate 3D model at least one of: a skin color, based on a suitable skin color model, an eye color, based on a suitable eye color model, and a hair, based on a suitable hair model. In some embodiments, each of the suitable skin color model, the suitable eye color model, and the suitable hair model may be determined utilizing on another suitable regressor and/or a suitable neural network.

Figure 1:
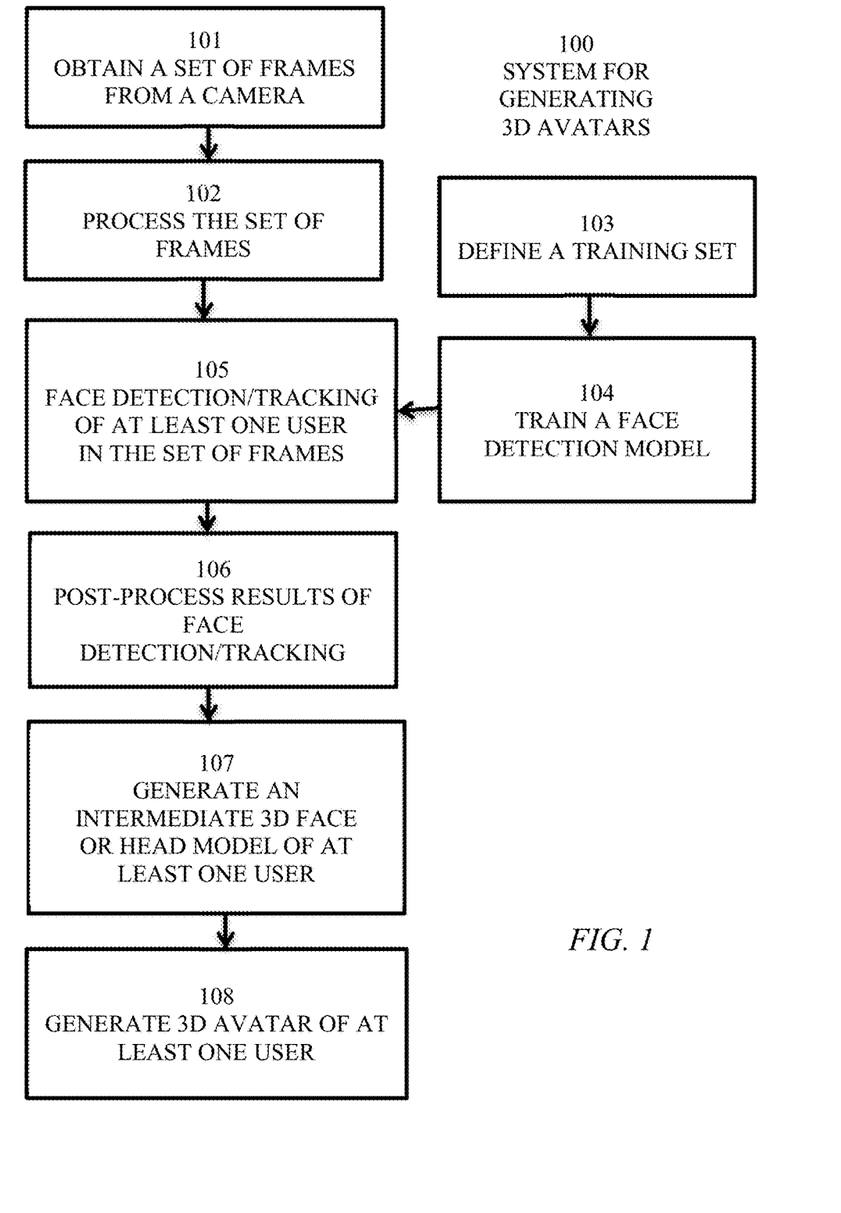
FIGS. 1-4 are representative of some exemplary aspects of the present invention in accordance with at least some principles of at least some embodiments of the present invention.

Illustrative Examples in Accordance to at Least Some Embodiments of the Present Invention FIG. 1 illustrates the exemplary steps that the exemplary specialized inventive computer engine 100 is configured/programmed to take to generate the inventive 3D avatar model in accordance with at least some embodiments of the present invention.

Step 101

In some embodiments, the exemplary specialized inventive computer engine 100 may be configured/programmed to obtain, real-time, a set of images/frames from a video stream taken by a camera of a mobile device or computer associated with a particular user. For example, the exemplary specialized inventive computer engine 100 may be configured/programmed to utilize at least one frame for the morphable face model to generate the intermediate face model, and, then, calculate 3D and/or 2D facial landmarks, utilizing one or more exemplary techniques provided in U.S. patent application Ser. No. 15/881,353 which is incorporated herein by reference for at least this specific purpose. Further, the exemplary specialized inventive computer engine 100 may be configured/programmed to utilize additional frames (e.g., 2-5) to refine the intermediate face model by, for example but not limited to, taking averages of the output hyperparameters of the intermediate face model.

Step 102

In some embodiments, the exemplary specialized inventive computer engine 100 may be further configured/programmed to extract one or more local features from each image that are then used as input from for several loops of an exemplary face detection trained regressor at step 104. For example, one or more local features may be pixel differences, such as, but not limited to, pixel value of a surrounding area relatively to a previously found landmark point minus pixel value of the previously found landmark point. In one non-limiting example of the local feature extraction, the exemplary specialized inventive computer engine 100 may be further configured/programmed to divide the examined window of a particular frame into cells (e.g., 16×16 pixels for each cell, relatively to the previously found points). For each pixel in a cell, the exemplary specialized inventive computer engine 100 may be further configured/programmed to compare the pixel to each of its 8 neighbors (on its left-top, left-middle, left-bottom, right-top, etc.), following the pixels, for example, along a circle in clockwise or counter-clockwise direction.

Step 103

In some embodiments, the exemplary computer system is further configured to generate and/or populate at least one database by rendering textured face models and determining, for example, face features/landmarks with predefined set of parameters such as, but not limited to: three-dimensional angles, translates, light vector coordinates, hair styles, beards, anthropometric parameters, facial expressions (e.g., anger, joy, etc.), and suitable others. For example, face models may be defined based on a set of facial landmarks where each landmark may be further defined based on a plurality of facial points where each face point may be further defined by the set of parameters such as, but not limited to: three-dimensional angles, translates, light vector coordinates, hair styles, beards, anthropometric parameters, facial expressions (e.g., anger, joy, etc.), and suitable others. FIG. 4 shows an illustrative example obtained based on Step 103.

Step 104

In some embodiments, the exemplary specialized inventive computer engine 100 is further configured/programmed to cause an exemplary face detection/tracking regressor (i.e., regression function) to be preliminarily trained based on at least one synthetic face model training set/database (e.g., the training set defined in Step 103 of FIG. 1), and then utilize the preliminary trained combined cascaded regressor to obtain at least one exemplary synthetic face training model at step 104. In one example, the exemplary combined cascaded regressor may belong to a class of 3D morphable face models and may be based on a combination of machine learning algorithms (e.g. random forest+linear regression, etc.).

In some embodiment, step 104 may be performed at client residing on the same electronic device with the camera and/or a remote dedicated server.

Step 105

In some embodiments, the exemplary computer system is further configured to utilize the resulting inventive face detection model (the trained regressor) of Step 104 to fit the at least one user's real image/frame set. In one example, the regressor may be run several times simultaneously using the series of frames taken in the real-time. In another example, the acquisition of the set of frames may be taken and the regressor may be trained consequently, so that the each next step enhances the accuracy of the previous.

Step 106

In some embodiments, the resulting data of step 105 representative of the inventive face model may be then further transformed by one or more suitable functions/techniques (i.e., post-processing technique(s)). In other implementations, some other suitable functions may be used to combine model results, such as, but not limited to, averaging parameters of the model (e.g., camera angles, anthropometric or morph coefficients, light vector coordinates, etc.), averaging parameters in a principal component analysis (PCA) space (i.e., PCA coefficients), averaging three-dimensional facial points, averaging two-dimensional facial landmarks, and any combination thereof.

Step 107

In some embodiments, the exemplary computer system may be further configured to utilize a suitable algorithm such as, but not limited to, machine learning technique (e.g., a neural network) to determine, for example but not limiting to, skin color, eye color to generate the intermediate 3D head model. In some embodiments, the exemplary inventive computer system may be configured to utilize an exemplary algorithm that determines the average color of a face region within facial landmarks. For example, in the case of the neural network algorithm, the exemplary computer system may be further configured to preliminarily separate the face from background. For example, in the case of detecting the eye color, the exemplary computer system may be further configured to utilize the neural network to separate eyes from other parts of the face, and then determine the eye color within eye landmarks.

In some embodiments, to generate the intermediate 3D head model, the exemplary inventive computer system may be configured to utilize one or more exemplary neural network methodologies that may include U-Net, convolutional neural network, and other suitable type of neural network. In some embodiments, a suitable genetic algorithm may be used to select an optimal architecture of a particular neural network by employing an active learning approach of machine learning (e.g., semi-supervised) to query the user (or some other information source) to obtain the desired outputs at new data points. In some embodiments, the active learning approach may be implemented by using support vector machines (SVMs) and exploiting the structure of the SVM to determine which data points to label. For example, in some embodiments, S, the active learning approach may be implemented by calculating the margin, W, of each unlabeled datum in $T_{U,i}$ and treat W as an n-dimensional distance from that datum to the separating hyperplane. For example, in some embodiments, the active learning approach may be implemented by using Minimum Marginal Hyperplane method(s) that assume(s) that the data with the smallest W are those that the SVM would be the most uncertain about and therefore should be placed in $T_{C,i}$ to be labeled. For example, in some embodiments, the active learning approach may be implemented by choosing data with the largest W. For example, in some embodiments, the active learning approach may be implemented by using tradeoff method(s) that may choose(s) a mix of the smallest and largest Ws.

For example, in some embodiments, the color and/or shape of eyes may be estimated using the convolutional neural network trained on the synthetic images with the active learning approach. In such scenario, the dataset may be synthesized using Unity3D software (Unity Technologies ApS, San Francisco, Calif.). For example, the exemplary output of the neural network processing may be several classes (e.g., pupil, iris, sclera, etc.).

In some embodiments, the exemplary inventive computer system may be configured to determine, for example, eye and/or skin color by identifying pixels whose values do not deviate significantly from a pre-determined color-model distribution (e.g., from the mean of the Gaussian distribution). In such scenario, the exemplary inventive computer system may be configured to determine regions of search by utilizing respective facial landmarks, detected with the face recognition model.

Step 108

In some embodiments, the exemplary specialized inventive computer engine of the exemplary computer system is further configured to combine all head components of the intermediate head model to generate the inventive avatar model. In one example, the exemplary specialized inventive computer engine of the exemplary computer system may be further configured to start with the intermediate face or head model. Then, the exemplary specialized inventive computer engine of the exemplary computer system may be further configured to add eyes, skin colors, and other suitable features based on outputs of Step 107. Then, the exemplary specialized inventive computer engine of the exemplary computer system may be further configured to utilize at least one suitable hair model, fitted with additional classifier, to select the closest hairstyle from the predefined set of hairstyles (e.g., 3D hairstyles). Then, the exemplary specialized inventive computer engine of the exemplary computer system may be further configured to fit the size and orientation of the hair and adds it to the intermediate model, by matching scale(s) and/or three-dimensional angle(s) and/or coordinates of the face, head, or both with hair.

For example, when an exemplary embodiment of the instant invention would be utilized for video communications, game industry, or similar others uses, an exemplary application programmed based on the inventive principles might first take one or several "selfie-style" images of a user (steps 101 and 102). At the same time or at some time before or after, an exemplary 3D morphable face model would be generated (e.g., steps 103-105), where the data set for training regressors would be synthetic (e.g. created using Facegen, or Unity or any suitable three-dimensional render). In this example, during the stages (106) and (107) the best face model from a given set of images would be built (e.g., some pre-determined parameters taken from each image would be averaged, some images would be excluded based on the error metrics, etc.). Also, facial expressions and emotions might be excluded, so the user's "avatar" would have only basic anthropometric personal features. Finally, at stage 108, a complete user model (user's avatar) would be created by, for example, augmenting the face/head model with the eye-color, hear-color, hear-style, skin-color models and some additional suitable elements (e.g., clothes).

FIG. 2 illustrates examples of the inventive avatar models, generated in accordance with one or more principles of the present invention as detailed herein.

Figure 3:
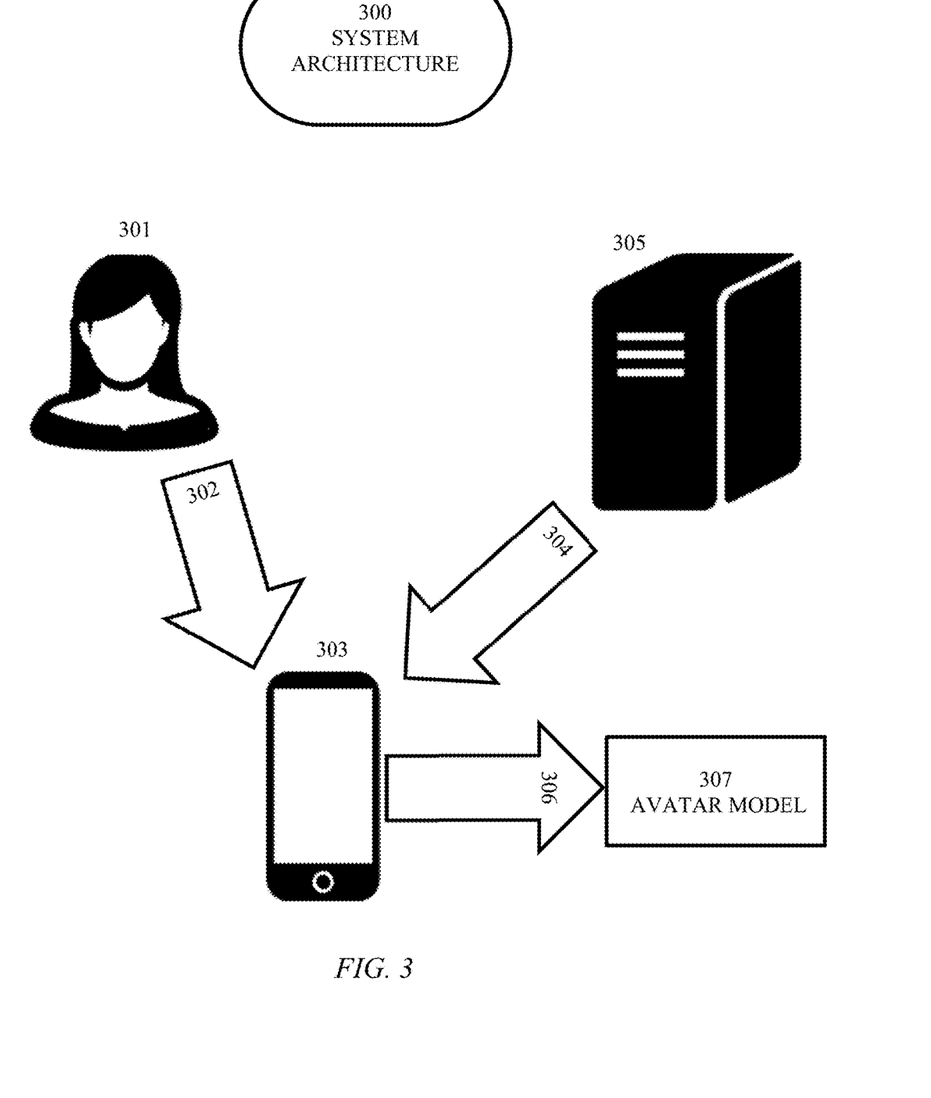

FIG. 3 illustrates an exemplary computer system, environment 300 incorporating certain embodiments of the present invention. As shown in FIG. 3, the exemplary computer environment 300 may at least include a mobile device or computer 303 associated with a user 301 and a server 305. A person skilled in the art can readily appreciate that suitable computer devices may also be included. For example, the mobile device or computer 303 may include any appropriate type of mobile devices, such as mobile phones, smartphones and tablets, or any appropriate type of computers, such as desktops, laptops, etc. Further, the server 305 may include any appropriate type of server computer or a plurality of server computers for providing technical ability to perform external calculations and simulations in order to improve avatars, or/and to store additional content for the application 304. In some embodiments, the user 301 may interact 302 with the mobile device and/or computer 303 by utilizing one or more application controls and/or mobile device and/or computer camera. In some embodiments, the user 303 may be a single user or a plurality of users. In some embodiments, the exemplary mobile device or computer 303 and/or server 305 may be implemented on any appropriate computing circuitry platform. In some embodiments, the exemplary mobile device or computer 303 may generate an output 306 (the inventive 3D avatar model) which may or may not be processed further or/and used in other applications.

A person skilled in the art would understand that, without violating the principles of the present invention detailed herein, in some embodiments, the exemplary illustrative methods and the exemplary illustrative systems of the present invention can be specifically configured to be utilized in any combination with one or more techniques, methodologies, and/or systems detailed in U.S. patent application Ser. No. 15/881,353 which is incorporated herein by reference for at least this specific purpose.

In some embodiments, the present invention provides for an exemplary computer-implemented method that may include at least the following steps of: training, by at least one processor, at least one face detection regressor with at least one synthetic face model database to obtain at least one face detection trained regressor; where the at least one synthetic face model database includes a plurality of facial features; where each facial feature is identified by a pre-defined set of parameters; obtaining, by the at least one processor, a plurality of frames having a visual representation of a face of at least one person; extracting, by the at least one processor, a plurality of local features from each frame of the plurality of frames; applying, by the at least one processor, for each frame, the at least one face detection trained regressor to the plurality of local features to detect or to track a presence of a face of a particular individual, based, at least in part, on: i) the plurality of facial features, ii) the plurality of local features, and iii) at least one pre-defined hyperparameter; constructing, by the at least one processor, an intermediate multi-dimensional face model of the face of the particular individual based on the detected or tracked presence of the face of the particular individual; applying, by the at least one processor, machine learning to determine a plurality of features of an intermediate multi-dimensional head model of the particular individual based on the detected or tracked presence of the face of the particular individual; constructing, by the at least one processor, at least one multi-dimensional avatar of the particular individual based, at least in part, on: i) the intermediate multi-dimensional face model of the particular individual, and ii) the plurality of features of the intermediate multi-dimensional head model of the particular individual; and utilizing, by the at least one processor, the at least one multi-dimensional avatar of the particular individual to perform at least one activity associated with the particular individual.

In some embodiments, the plurality of frames is part of a video stream. In some embodiments, the video stream is a real-time video stream. In some embodiments, the real-time video stream is a live video stream.

In some embodiments, the at least one face detection regressor is a combined cascaded regressor that is based on a combination of machine learning algorithms.

In some embodiments, the pre-defined set of parameters is selected from the group consisting of: three-dimensional angles, translates, light vector coordinates, hair styles, beards, anthropometric parameters, facial expressions, and any combination thereof.

In some embodiments, the presence of the face of the particular individual has been detected or has been tracked by applying at least one of: averaging at least two hyperparameters; averaging at least two hyperparameters in a principal component analysis (PCA) space; averaging three-dimensional facial points of at least one facial landmark; averaging two-dimensional facial landmarks; and any combination thereof.

In some embodiments, the plurality of facial features is a plurality of facial landmarks.

In some embodiments, at least one frame of the plurality of frames is obtained by a camera of a portable electronic device and where the at least one processor is at least one first processor of the portable electronic device.

In some embodiments, the training of the at least one face detection regressor is performed by at least one second processor; and where the at least one second processor is distinct from the at least one first processor of the portable electronic device and is remotely located from the portable electronic device.

In some embodiments, the present invention provides for an exemplary computer system that may include at least the following component: a camera component, where the camera component is configured to acquire a visual content, where the visual content includes a plurality of frames having a visual representation of a face of at least one person; and at least one processor configured to: train at least one face detection regressor with at least one synthetic face model database to obtain at least one face detection trained regressor; where the at least one synthetic face model database includes a plurality of facial features; where each facial feature is identified by a pre-defined set of parameters; extract a plurality of local features from each frame of the plurality of frames; apply, for each frame, the at least one face detection trained regressor to the plurality of local features to detect or to track a presence of a face of a particular individual, based, at least in part, on: i) the plurality of facial features, ii) the plurality of local features, and iii) at least one pre-defined hyperparameter; construct an intermediate multi-dimensional face model of the face of the particular individual based on the detected or tracked presence of the face of the particular individual; apply machine learning to determine a plurality of features of an intermediate multi-dimensional head model of the particular individual based on the detected or tracked presence of the face of the particular individual; construct at least one multi-dimensional avatar of the particular individual based, at least in part, on: i) the intermediate multi-dimensional face model of the particular individual, and ii) the plurality of features of the intermediate multi-dimensional head model of the particular individual; and utilize the at least one multi-dimensional avatar of the particular individual to perform at least one activity associated with the particular individual.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A method, comprising:
    training, by at least one processor, at least one multi-dimensional face detection regressor with at least one synthetic face model database to obtain at least one multi-dimensional face detection trained regressor that is trained to utilize a plurality of latent variables of at least one multi-dimensional morphable model (MDMM) to predict a multi-dimensional face or a multi-dimensional head from a plurality of local binary features extracted from a visual input having a face of at least one person;
    wherein the at least one synthetic face model database is distinct from the visual input having the face of the at least one person;
    wherein the plurality of latent variables of the MDMM defines one or more of:
        i) at least one hair-related parameter,
        ii) at least one eye-related parameter,
        iii) at least one skin-related parameter,
        iv) at least one gender-related parameter,
        v) at least one race-related parameter, and
        vi) at least one age-related parameter;
    obtaining, by the at least one processor, the visual input having a visual representation of the face of the at least one person;
    extracting, by the at least one processor, the plurality of local binary features from the visual input;
    applying, by the at least one processor, the at least one multi-dimensional face detection trained regressor to detect or to track the at least one person in the visual input by generating or updating a person-specific predicted intermediate MDMM of the face or a head of the at least one person, wherein the person-specific predicted intermediate MDMM of the face or the head of the at least one person comprises a plurality of person-specific latent variables obtained by fitting the plurality of latent variables to the visual representation of the face of the at least one person based, at least in part, on the plurality of local binary features;
    wherein the plurality of person-specific latent variables of the person-specific predicted intermediate MDMM of the face or the head of the at least one person defines one or more of:
        i) at least one person-specific hair-related parameter of the at least one person,
        ii) at least one person-specific eye-related parameter of the at least one person,
        iii) at least one person-specific skin-related parameter of the at least one person,
        iv) at least one person-specific gender-related parameter of the at least one person,
        v) at least one person-specific race-related parameter of the at least one person, and
        vi) at least one person-specific age-related parameter of the at least one person;
    constructing or updating, by the at least one processor, at least one person-specific multi-dimensional avatar of the at least one person based, at least in part, on the person-specific predicted intermediate MDMM of the face or the head of the at least one person; and
    utilizing, by the at least one processor, the at least one person-specific multi-dimensional avatar of the at least one person to perform at least one activity associated with the at least one person.

2. The method of claim 1, wherein the visual input comprises a plurality of frames of a video stream.

3. The method of claim 2, wherein the video stream is a real-time video stream.

4. The method of claim 3, wherein the real-time video stream is a live video stream.

5. The method of claim 1, wherein the at least one multi-dimensional face detection regressor is a combined cascaded regressor that is based on a combination of distinct machine learning algorithms.

6. The method of claim 1, wherein the plurality of latent variables of the MDMM is selected from the group consisting of: three-dimensional angles, translates, light vector coordinates, hair styles, beards, anthropometric parameters, and facial expressions.

7. The method of claim 1, further comprising:
    transforming, by the at least one processor, the person-specific predicted intermediate MDMM of the face or the head of the at least one person to an updated person-specific predicted intermediate MDMM of the face or the head of the at least one person by applying at least one of:
    averaging at least two hyperparameters;
    averaging at least two hyperparameters in a principal component analysis (PCA) space;
    averaging three-dimensional facial points of at least one facial landmark;
    averaging two-dimensional facial landmarks; and
    any combination thereof.

8. The method of claim 1, further comprising:
    determining, by the at least one processor, a plurality of predicted facial landmarks of the at least one person from the plurality of person-specific latent variables.

9. The method of claim 1, wherein the visual input is obtained by a camera of a portable electronic device and wherein the at least one processor is at least one first processor of the portable electronic device.

10. The method of claim 9, wherein the training of the at least one multi-dimensional face detection regressor is performed by at least one second processor; and wherein the at least one second processor is distinct from the at least one first processor of the portable electronic device and is remotely located from the portable electronic device.

11. A system comprising:
a camera component, wherein the camera component is configured to acquire a visual content, wherein the visual content comprises a visual representation of a face of at least one person; and
at least one processor configured to:
train at least one multi-dimensional face detection regressor with at least one synthetic face model database to obtain at least one multi-dimensional face detection trained regressor that is trained to utilize a plurality of latent variables of at least one multi-dimensional morphable model (MDMM) to predict a multi-dimensional face or a multi-dimensional head from a plurality of local binary features extracted from a visual input having a face of at least one person;
wherein the at least one synthetic face model database is distinct from the visual input having the face of the at least one person;
wherein the plurality of latent variables of the MDMM defines one or more of:
i) at least one hair-related parameter,
ii) at least one eye-related parameter,
iii) at least one skin-related parameter,
iv) at least one gender-related parameter,
v) at least one race-related parameter, and
vi) at least one age-related parameter;
extract the plurality of local binary features from the visual content;
apply, the at least one multi-dimensional face detection trained regressor to detect or to track the at least one person in the visual content by generating or updating a person-specific predicted intermediate MDMM of the face or a head of the at least one person, wherein the person-specific predicted intermediate MDMM of the face or the head of the at least one person comprises a plurality of person-specific latent variables obtained by fitting the plurality of latent variables to the visual representation of the face of the at least one person based, at least in part, on the plurality of local binary features;
wherein the plurality of person-specific latent variables of the person-specific predicted intermediate MDMM of the face or the head of the at least one person defines one or more of:
i) at least one person-specific hair-related parameter of the at least one person,
ii) at least one person-specific eye-related parameter of the at least one person,
iii) at least one person-specific skin-related parameter of the at least one person,
iv) at least one person-specific gender-related parameter of the at least one person,
v) at least one person-specific race-related parameter of the at least one person, and
vi) at least one person-specific age-related parameter of the at least one person;
construct or update at least one person-specific multi-dimensional avatar of the at least one person based, at least in part, on the person-specific predicted intermediate MDMM of the face or the head of the at least one person; and
utilize the at least one person-specific multi-dimensional avatar of the at least one person to perform at least one activity associated with the at least one person.

12. The system of claim 11, wherein the visual content comprises a plurality of frames of a video stream.

13. The system of claim 12, wherein the video stream is a real-time video stream.

14. The system of claim 13, wherein the real-time video stream is a live video stream.

15. The system of claim 11, wherein the at least one multi-dimensional face detection regressor is a combined cascaded regressor that is based on a combination of distinct machine learning algorithms.

16. The system of claim 11, wherein the plurality of latent variables of the MDMM is selected from the group consisting of: three-dimensional angles, translates, light vector coordinates, hair styles, beards, anthropometric parameters, and facial expressions.

17. The system of claim 11, wherein the at least one processor is further configured to:
transform the person-specific predicted intermediate MDMM of the face or the head of the at least one person to an updated person-specific predicted intermediate MDMM of the face or the head of the at least one person applying at least one of:
averaging at least two hyperparameters;
averaging at least two hyperparameters in a principal component analysis (PCA) space;
averaging three-dimensional facial points of at least one facial landmark;
averaging two-dimensional facial landmarks; and
any combination thereof.

18. The system of claim 11, wherein the at least one processor is further configured to:
determine a plurality of predicted facial landmarks of the at least one person from the plurality of person-specific latent variables.

19. The system of claim 11, wherein the camera component is located within a portable electronic device and wherein the at least one processor is at least one first processor of the portable electronic device.

20. The system of claim 19, further comprising:
at least one second processor configured to train the at least one multi-dimensional face detection regressor; and
wherein the at least one second processor is distinct from the at least one first processor of the portable electronic device and is remotely located from the portable electronic device.

* * * * *